US008701941B2

(12) United States Patent
Fuller et al.

(10) Patent No.: US 8,701,941 B2
(45) Date of Patent: Apr. 22, 2014

(54) FOOD DISPENSING CONTAINER

(75) Inventors: Kevin S. Fuller, Chaska, MN (US); James G. Skakoon, Saint Paul, MN (US)

(73) Assignee: Federal Molding Corp., Chaska, MN (US)

( * ) Notice: Subject to any disclaimer, the term of this patent is extended or adjusted under 35 U.S.C. 154(b) by 189 days.

(21) Appl. No.: 13/042,082

(22) Filed: Mar. 7, 2011

(65) Prior Publication Data

US 2011/0215116 A1  Sep. 8, 2011

Related U.S. Application Data

(60) Provisional application No. 61/397,714, filed on Mar. 5, 2010.

(51) Int. Cl.
*A47G 19/24* (2006.01)

(52) U.S. Cl.
USPC ........ 222/148; 222/196.3; 222/226; 222/242; 222/480; 222/556; 222/565; 241/83; 366/194; 366/196

(58) Field of Classification Search
USPC ........ 222/148, 242, 370, 158, 362, 565, 480, 222/226, 233, 235, 236, 237, 238, 239, 240, 222/241, 196.1–196.5, 153.04, 153.14, 222/153.03; 366/194, 196, 184, 185
See application file for complete search history.

(56) References Cited

U.S. PATENT DOCUMENTS

| 205,576 | A | | 7/1878 | Robbins | |
|---|---|---|---|---|---|
| 942,562 | A | * | 12/1909 | Hyde | 222/548 |
| 1,083,320 | A | * | 1/1914 | Daly | 222/148 |
| 1,110,383 | A | * | 9/1914 | Flanagan | 222/240 |
| 1,127,735 | A | * | 2/1915 | Comstock | 222/240 |
| 1,265,562 | A | | 5/1918 | Wessel | |
| 1,820,817 | A | | 8/1931 | McRae | |
| 1,940,751 | A | * | 12/1933 | Hermani | 222/248 |
| 2,024,920 | A | * | 12/1935 | Gibbons | 222/241 |
| 2,656,076 | A | | 10/1953 | Von Essen | |
| 2,826,343 | A | | 3/1958 | Albiani | |
| 2,937,793 | A | * | 5/1960 | Cornelius | 222/148 |

(Continued)

FOREIGN PATENT DOCUMENTS

| JP | 07-030840 U | 6/1995 |
|---|---|---|
| JP | 2002-114248 A | 4/2002 |
| JP | 2008-189375 A | 8/2008 |
| KR | 10-2008-0049436 A | 6/2008 |

*Primary Examiner* — Kevin P Shaver
*Assistant Examiner* — Michael J Melaragno
(74) *Attorney, Agent, or Firm* — Douglas J. Christensen

(57) ABSTRACT

A container for dispensing food products can include a clump decimator portion for breaking up food clumps. In one embodiment, a container comprises a container portion having an open interior and an open top and a cover for selectively covering the open top. The cover can include a cover base portion and a rotatable top portion configured to be coupled on top of the base portion. The cover base portion can include a plurality of dispensing apertures for allowing a food product to be dispensed therethrough. The rotatable top portion can be selectively rotatable relative to the cover base portion and the container portion. The clump decimator portion can extend downwardly and radially from the top portion through the cover base portion and into the container portion. The clump decimator can rotate as the rotatable top portion is rotated to agitate the contents of the container portion while they are being dispensed.

17 Claims, 13 Drawing Sheets

(56) References Cited

U.S. PATENT DOCUMENTS

| | | | |
|---|---|---|---|
| 3,018,931 A | 1/1962 | Westgate | |
| 3,311,264 A * | 3/1967 | Cayer | 222/25 |
| 5,219,100 A | 6/1993 | Beck et al. | |
| 5,480,068 A * | 1/1996 | Frazier et al. | 222/153.03 |
| 5,680,968 A | 10/1997 | Moore | |
| 5,971,231 A | 10/1999 | Samz et al. | |
| 6,116,469 A * | 9/2000 | Wallays et al. | 222/148 |
| 6,179,167 B1 * | 1/2001 | Boot et al. | 222/181.3 |
| 6,250,517 B1 * | 6/2001 | Samz et al. | 222/565 |
| 6,308,870 B2 | 10/2001 | Samz et al. | |
| 6,464,113 B1 | 10/2002 | Vogel | |
| 6,488,187 B2 * | 12/2002 | Sheffler et al. | 222/480 |
| 6,575,323 B1 * | 6/2003 | Martin et al. | 220/254.3 |
| 6,935,538 B1 * | 8/2005 | Stelcher | 222/196.3 |
| D530,610 S * | 10/2006 | Samz et al. | D9/447 |
| 7,134,575 B2 | 11/2006 | Vogel et al. | |
| 7,422,169 B2 * | 9/2008 | Mueller | 241/168 |
| 2010/0230446 A1 * | 9/2010 | Daggett | 222/480 |

* cited by examiner

FOOD DISPENSING CONTAINER

RELATED APPLICATION

The present Application claims the benefit of U.S. Provisional Application No. 61/397,714, filed Mar. 5, 2010, which is fully incorporated herein by reference.

FIELD OF THE INVENTION

The present invention relates to containers for dispensing food items. More particularly, the present invention relates to a container for dispensing food items that allows for clumped food items to be broken up as the food is being dispensed.

BACKGROUND OF THE INVENTION

It is well known to provide a container having one or more apertures for dispensing food items such as grated cheese and spices. When such salt shakers, grated cheese shakers, or other types of food supplements in the nature of granular or flake particles are provided in shakers, moisture can cause the particles to adhere to one another in clumps, thus impeding exit of those particles when the shaker is inverted. When the particles in the shaker bind together in clumps larger than the apertures, they are precluded and/or impeded from passing through the apertures when the shaker is inverted and shook. Mass marketed granular cheese products are sold in inexpensive disposable polymer containers typically with a cylindrical container portion with an open threaded mouth substantially the circumferential size of the portion of the container that holds the granular cheese product. Typically there is no clump decimation feature other than by shaking and forcing the food product through apertures in the top cover. This results in a lack of control of the dispensed food.

The covers in such granular cheese products are typically injection molded with one or two pieces and in order to be commercially viable should be very inexpensive to manufacture, simple to operate, reliable, and highly functional.

Certain solutions to breaking up spices or food products in dispense containers are known.

U.S. Pat. No. 7,134,575 to Vogel et al. discloses a two piece closure for a food container including a top having dispensing apertures therethrough and a cover that can be rotatable relative to the top. The cover can have a downwardly extending projection in the form of a radially extending skirt configured to sweep residual matter that may remain on the surface of the top. As the cover is rotated about the top, matter is collected by the skirt and returned into the container through the dispensing apertures. While this skirt may function to remove residual matter from the top, it does nothing to agitate matter that may be adhering together to allow it to come through the dispensing apertures from the container in the first place.

U.S. Pat. No. 6,116,469 to Wallays et al. discloses a condiment shaker including a wiper unit including a plurality of wiping blades. In operation, the base container and wiper unit are rotated relative to a dispensing top. The wiping blades rotate along an inner surface of the dispensing top to encourage the flow of food product through the apertures. However, because the wiper unit does not rotate relative to the base container, it does not serve to agitate the contents of the container.

U.S. Pat. No. 6,935,538 to Stelcher discloses an anti-clog system for a shaker. The anti-clog system includes a rotatable central stem extending into the container with an agitator portion comprising a screw-like thread or projecting elements extending from the central stem. The stem is rotated via a winder that is centered over the stationary cap. However, the central location of the winder means that a user's hand operating the winder may interfere with dispensation of the product if the agitator portion is being actuated while the product is being dispensed.

The above containers typically either do not provide an internal agitation feature that readily rotatable with respect to the base container, or are not amenable to inexpensive manufacture. There thus remains a need in the art for a food shaker that can adequately break up clumped matter within the container while the matter is being dispensed by the shaker and is suitable to be sold as a disposable container with the product. There also remains a need to be able to manufacture and assemble such a container quickly and inexpensively.

SUMMARY OF THE INVENTION

A container for dispensing food products can include an internal food clump decimator portion configured as an agitator portion for breaking up food clumps. In one embodiment, a container comprises a container portion having an open interior and an open top and a cover for selectively covering the open top. The cover can include a cover base portion and a rotatable top portion configured to be coupled on top of the base portion. The cover base portion can include a plurality of dispensing apertures for allowing a food product to be dispensed therethrough. The rotatable top portion has a gripping region extending circumferentially around the cover and can be selectively rotatable relative to the cover base portion and the container portion. The food decimator or agitator portion can extend downwardly and radially from the top portion through the cover base portion and into the container portion. The agitator portion is part of and is fixed with respect to the rest of the rotatable cover top portion. The agitator portion rotates as the rotatable top portion is rotated to agitate the contents of the container portion while they are being dispensed. In an embodiment the agitator portion, including a shaft portion, and arm portions extending from the shaft portion, are unitary a traversing wall portion of the top cover, for example, they may be molded as one piece.

In an embodiment, the top cover and container portion both have a cylindrical outer surface. In an embodiment the top cover has a radius substantially equal to the radius of the container portion. In an embodiment the cover portion of the top cover, and the base portion of the top cover both have a radius substantially equal to the radius of the container portion. "Substantially" herein means dimensionally within 10%.

An object and advantage of embodiments of the present invention is the ability to agitate the contents of the container. The agitator portion extends through the cover base portion of the cover into an opening defined by the cover base portion and container portion, which allows for clumped food articles to be broken up prior to being dispensed. Food particles can therefore flow freely from the container without clogging the dispensing apertures.

Another object and advantage of embodiments of the present invention is that the contents of the container can be agitated while the product is being dispensed. The agitator portion can be actuated by rotating the top portion of the cover via an outer peripheral grip. This allows the contents to be agitated without a user's hand interfering with dispensing the contents through the dispensing apertures.

A further object and advantage of particular embodiments of the present invention is that it redundantly minimizes the chance of the cover accidentally becoming disassembled. The radially extending agitator portion of the top portion of the cover can assemble through an elongate radial slot in the base portion. So long as the agitator portion is not perfectly in line with the slot, the top portion and cover base portion are precluded from being detached from each other. The top portion also has a first latch portion configured as a lip extending along an inner circular peripheral surface thereof that provides an interference snap fit with a second cooperating latch portion configured as a rib extending along an outer peripheral circumferential surface of the base portion. The interlocking lip(s) and rib(s) prevent the top portion from being decoupled from the cover base portion due to normal usage forces even if the agitator portion and the elongate slot are perfectly in line.

Another object and advantage of embodiments of the present invention is that a lid on the rotatable top portion can be precluded from interfering with dispensing of the product. The rotatable top portion has an aperture that aligns with one or more of the dispensing apertures that is selectively coverable with a hinged lid. Lid can include a slot and top portion can include a rib that interlock to hold the lid open while food is being dispensed. This precludes lid from partially or totally closing during use and interfering with dispensation of the food product.

Another object and advantage of embodiments of the present invention is ease of assembly. The agitator portion can be integrally formed with the top portion so that the cover comprises a two piece assembly. Cover can be assembled by simply inserting the agitator portion through the elongate slot in cover base portion and interlocking peripheral lip(s) on top portion with peripheral rib(s) on base portion.

Another object and advantage of embodiments of the present invention is ease of manufacture. Cover can be manufactured by injection molding. Top portion and cover base portion can be simultaneously injection molded in a side-by-side manner to provide a quick and cost-effective method of manufacturing the cover. The two components can be immediately assembled subsequent to molding by automated means in the molding equipment.

A feature and advantage of the invention is that the agitation feature is in particular embodiments adjacent to the dispense openings thus efficiently breaking up clumps that are in position to be dispensed. In other embodiments the agitation feature can extend further down into the container portion.

A feature and advantage of embodiments of the invention is that the clump decimator portion provides for a more controlled dispensing of food product, particularly grated cheese products, than other commercial containers.

DETAILED DESCRIPTION

Figure 1A:
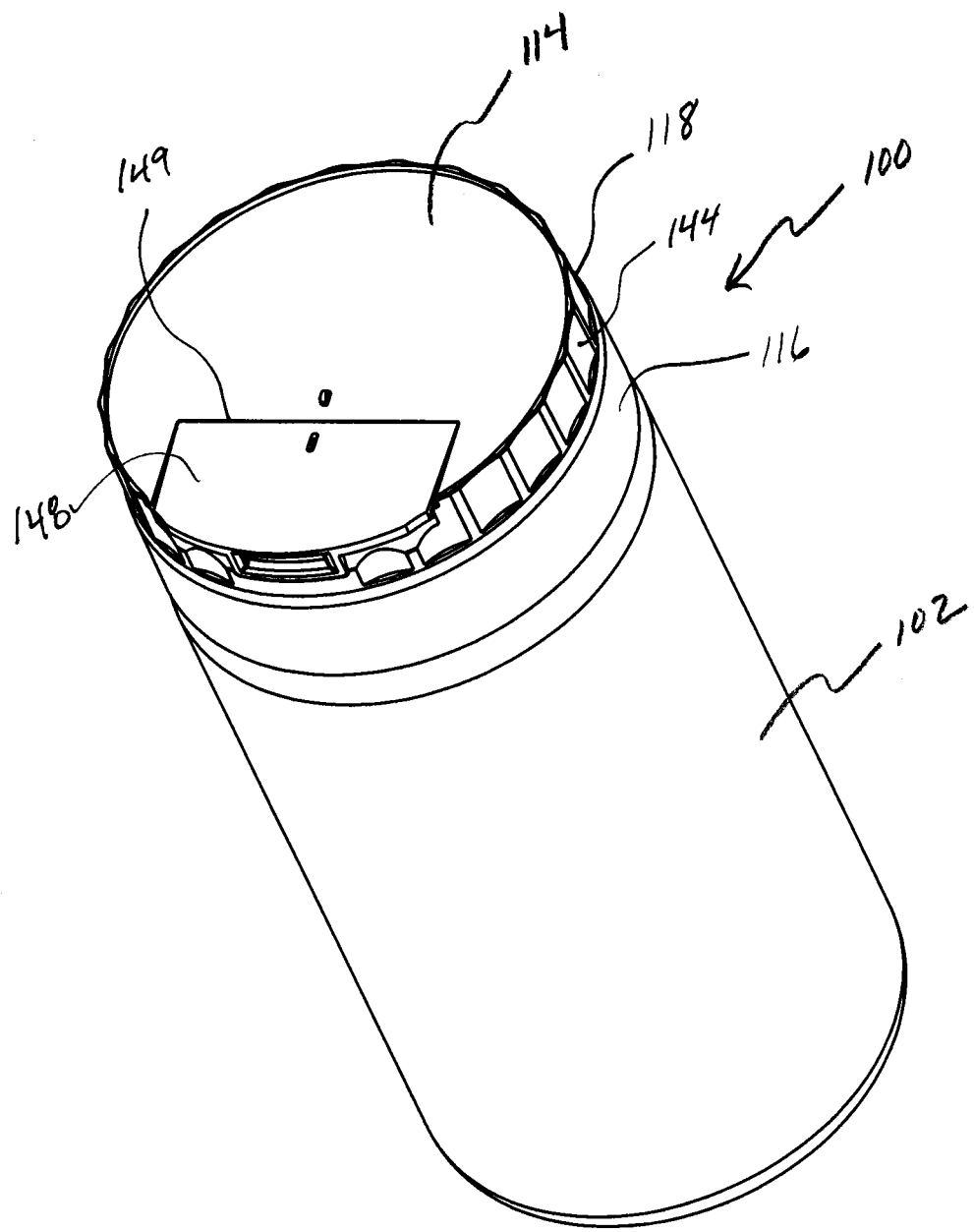
FIG. 1A is a perspective view of a food dispensing container according to an embodiment of the present invention.
Figure 1B:
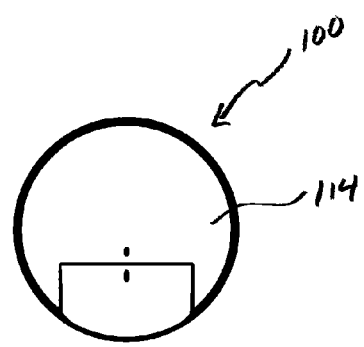
FIG. 1B is a top view of the food dispensing container of FIG. 1A.
Figure 1C:
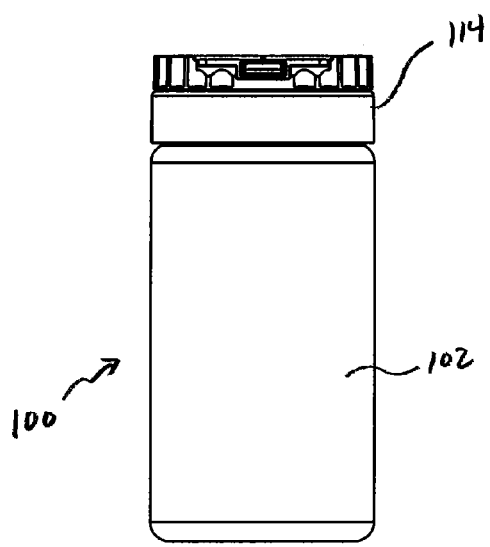
FIG. 1C is a front view of the food dispensing container of FIG. 1A.
Figure 1D:
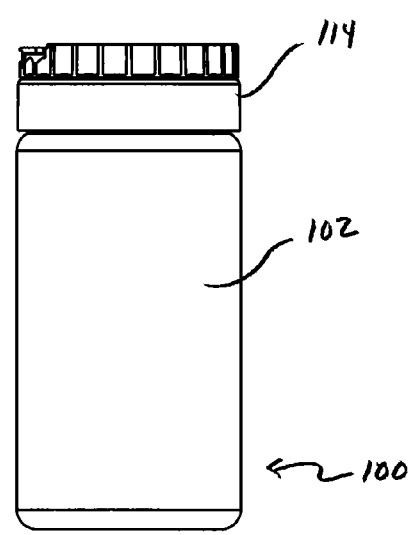
FIG. 1D is a side view of the food dispensing container of FIG. 1A.
Figure 1E:
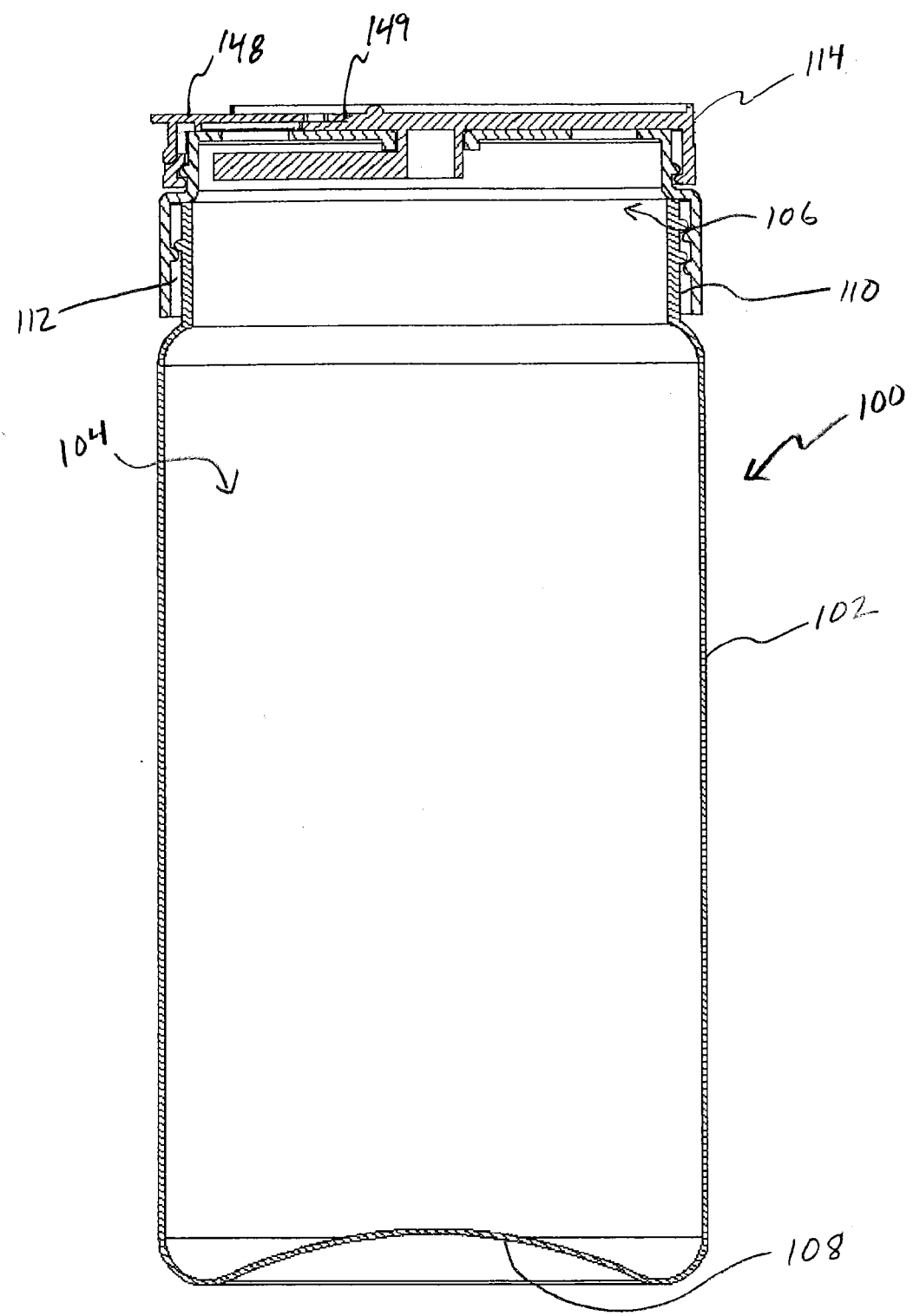
FIG. 1E is a cross-sectional view the food dispensing container of FIG. 1A.
Figure 1F:
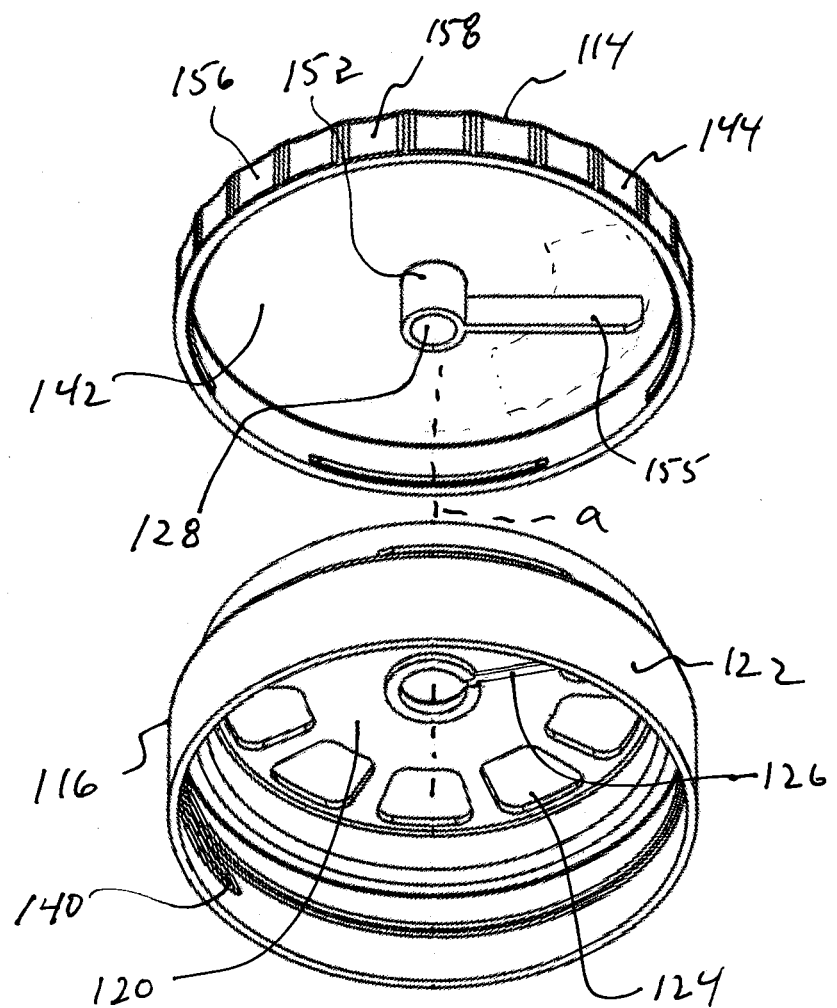
FIG. 1F is an exploded view of the top cover of the food dispensing container according to an embodiment of the invention.
Figure 2:
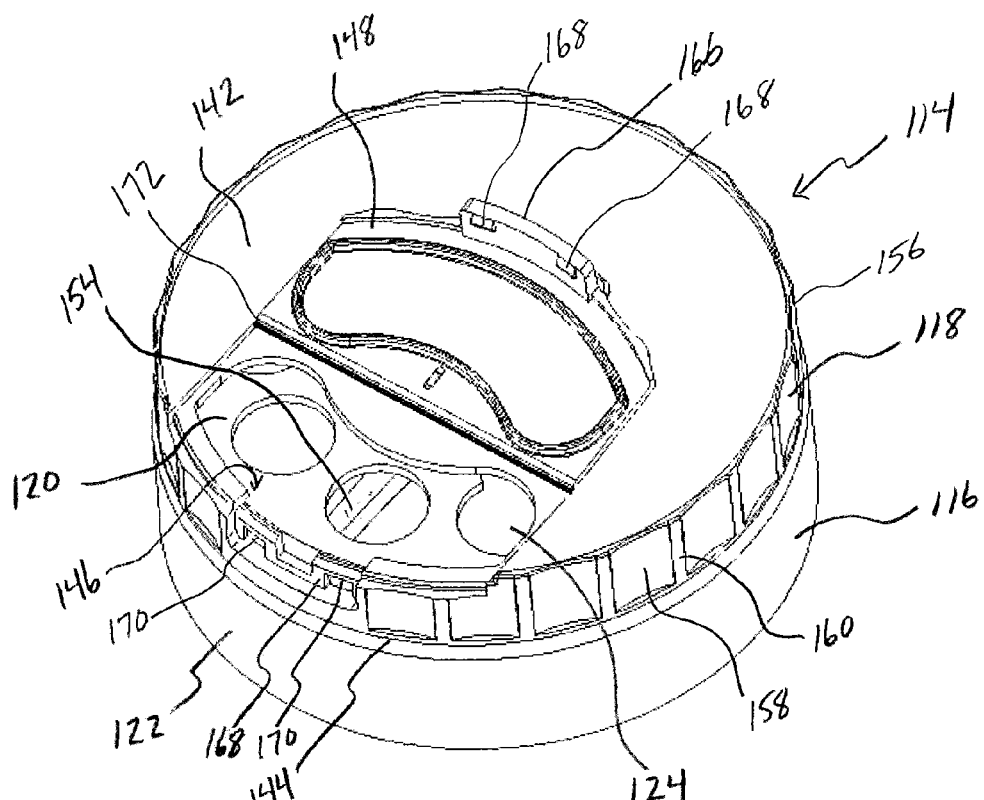
FIG. 2 is a perspective view of a cover for a food dispensing container according to an embodiment of the present invention.
Figure 3:
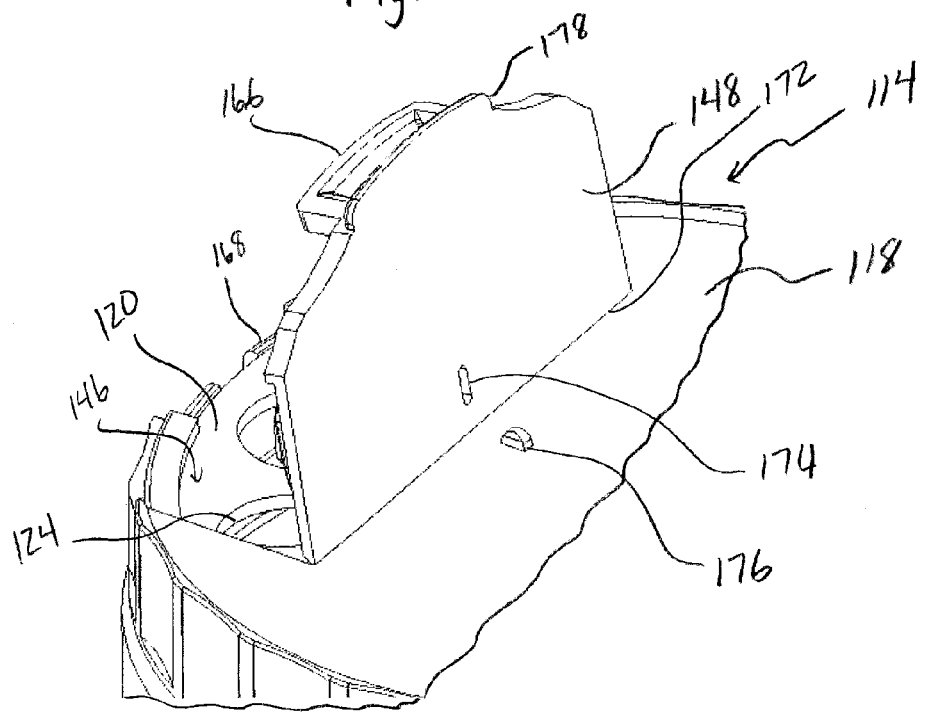
FIG. 3 is a partial perspective view of a cover for a food dispensing container according to an embodiment of the present invention.
Figure 4:
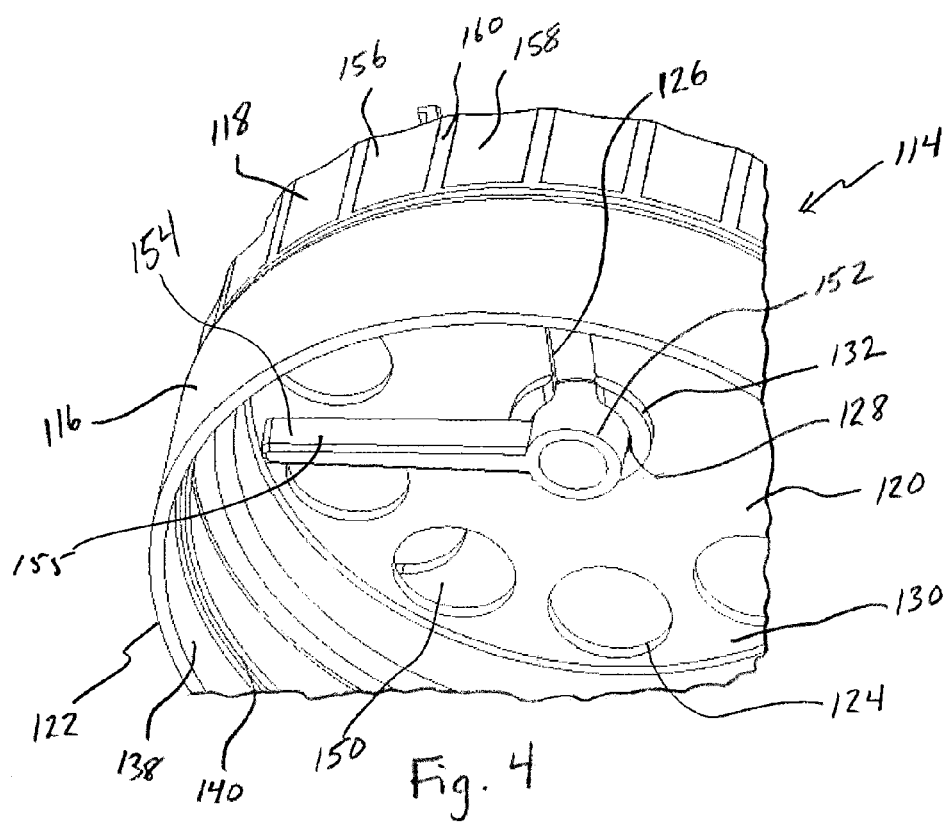
FIG. 4 is a partial perspective view of a cover for a food dispensing container according to an embodiment of the present invention.
Figure 5:
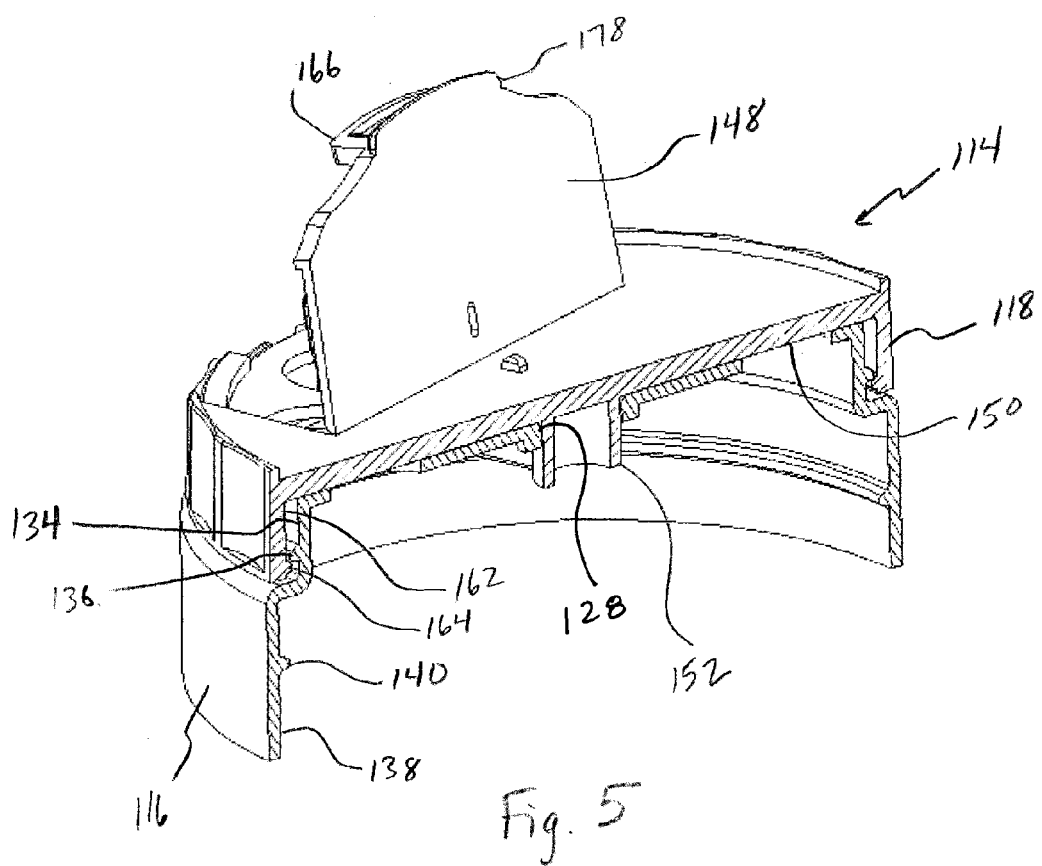
FIG. 5 is a cross-sectional view of a cover for a food dispensing container according to an embodiment of the present invention.
Figure 6:
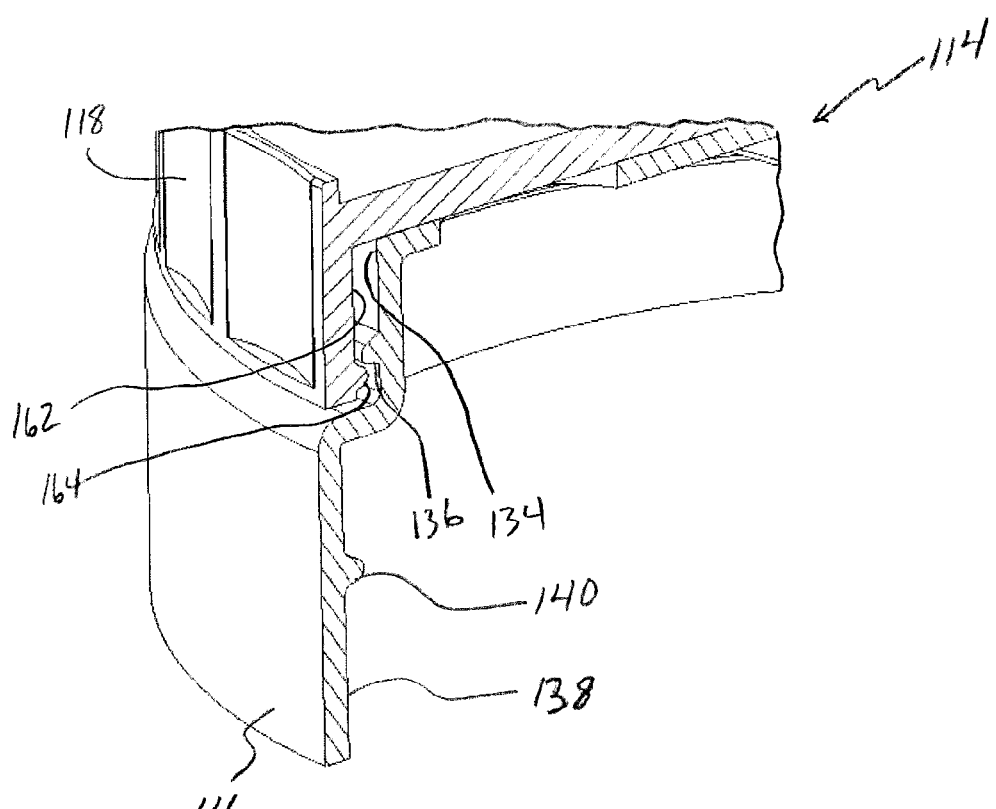
FIG. 6 is a partial cross-sectional view of a cover for a food dispensing container according to an embodiment of the present invention.

Referring to FIGS. 1A-1F, there can be seen a food dispensing container 100 according to an embodiment of the present invention. Food dispensing container 100 generally includes a container portion 102 and a cover 114. Container portion 102 can have a generally cylindrical shape with an open interior 104 and an open top 106 that is selectively coverable with cover 114. Open interior 104 can be used to contain a food product to be dispensed from the container 100. Such food products are preferably in the nature of granular or flake particles, such as, for example, grated cheeses or spices. Container portion 102 can also include a concave bottom 108. Concave bottom 108 provides a stronger base for container 100 that prevents the bottom of the container portion 102 from bulging outward and facilitates placement on flat surfaces. An outer surface 110 of container portion 102 at a neck 111 can include threads 112 for attachment to cover 114. Container portion 102 is preferably formed of a lightweight plastic material, such as, for example, polyethylene terephthalate (PETE).

As can be seen more particularly in FIGS. 2-8, cover 114 can comprise a two-piece cover including a cylindrical cover base portion 116 and a rotatable top portion 118. Cover base portion 116 can include a generally planar traversing wall portion 120 with a generally planar top surface 121 and a skirt shaped or ring shaped body 122 extending downwardly from wall portion 120. Traversing wall portion 120 can include a plurality of dispensing apertures 124 extending around and through wall portion 120. Wall portion 120 can also include a central opening 128 and an elongate slot 126 extending radially from central opening. The inner side 130 of top portion 120 can include a downwardly extending flange 132. An outer peripheral surface 134 of body 122 can include one or more peripherally extending ribs 136. An inner surface 138 of body 122 can include threads 140 for attachment to threads 112 of container portion 102.

Rotatable top portion 118 can also include a traversing top wall portion 142 with a top surface 143 and a skirt 144 extending downwardly therefrom. Top wall portion 142 can include an opening 146 extending therethrough that is selectively coverable with a lid 148 configured as a flap. The lid may be connected with a thinned portion of material constituting a living hinge 149. The inner side 150 of top wall portion 142 can include a shaft portion 152 extending downwardly therefrom as part of a clump decimator portion 154 configured as an agitator portion 154. Agitator portion also included an arm 155 extending radially from shaft portion 152. As will be discussed more fully herein, agitator portion 154 can be used to break up clumped food articles as they are being dispensed from the container 100. Outer surface 156 of body 144 can include a series of depressions 158 and projections 160 to provide a peripheral gripping surface on outer surface 150. Alternatively, outer surface 156 can be provided with any other textured, i.e., not smooth, surface to aid in gripping outer surface 156. Each depression 158 can comprise an inwardly curved, partially cylindrical arcuate surface 159 extending to and exposed at the top surface 143. Depressions 158 and projections 160 may also extend upwardly above top surface 143 to define an upwardly extending lip 161 extending at least partially around top portion 142. Cylindrical inner surface 162 of body 144 can include one or more peripheral lips 164 extending inwardly therefrom that aid in retaining the rotatable top portion 118 on cover base portion 116. The top cover and container portion have an axis a.

When lid 148 is opened, it exposes dispensing apertures 124 in cover base portion 116 through opening 146, which allows a food product within the open interior 104 of container portion 102 to be dispensed through dispensing apertures 124. When lid 148 is closed, opening 146 and dispensing apertures 124 are covered, preventing food product from exiting container portion 102. Lid 148 can be selectively moved between an open position and a closed position by a hinge 172. In one embodiment, hinge 172 is a living hinge. Lid 148 can releasably clasp to body 144 to be retained in the closed position. Clasping lid 148 closed inhibits opening 146 from being accidentally exposed, which could potentially allow the contents of container 100 to be expelled when it is not desired. Lid 148 can include a downwardly extending tongue 166 that provides a snap fit with a slot 168 recessed in the peripheral outer surface 156 of body 144 to clasp the lid 148 in the closed position. To further aid in retaining the lid 148 in the closed position, tongue 166 can include one or more projections 168 configured to mate with one or more indents 170 in slot 168.

Lid 148 can also be retained in the open position to prevent it from partially or totally closing over opening 146 when not intended and interfering with dispensation of the food product from container 100 through opening 146. Lid 148 can be retained in the open position by inserting a slot 174 through lid 148 onto a rib 176 projecting outwardly from top surface 143. In one embodiment, lid 148 can include a tab 178 projecting outwardly from lid 148 and extending beyond outer surface 156 of body 144 to provide a convenient grasping point for a user to aid in releasing lid 148 from the closed position. In another embodiment, lid 148 does not include a tab 178 and is instead flush with outer surface 156.

Figure 9:
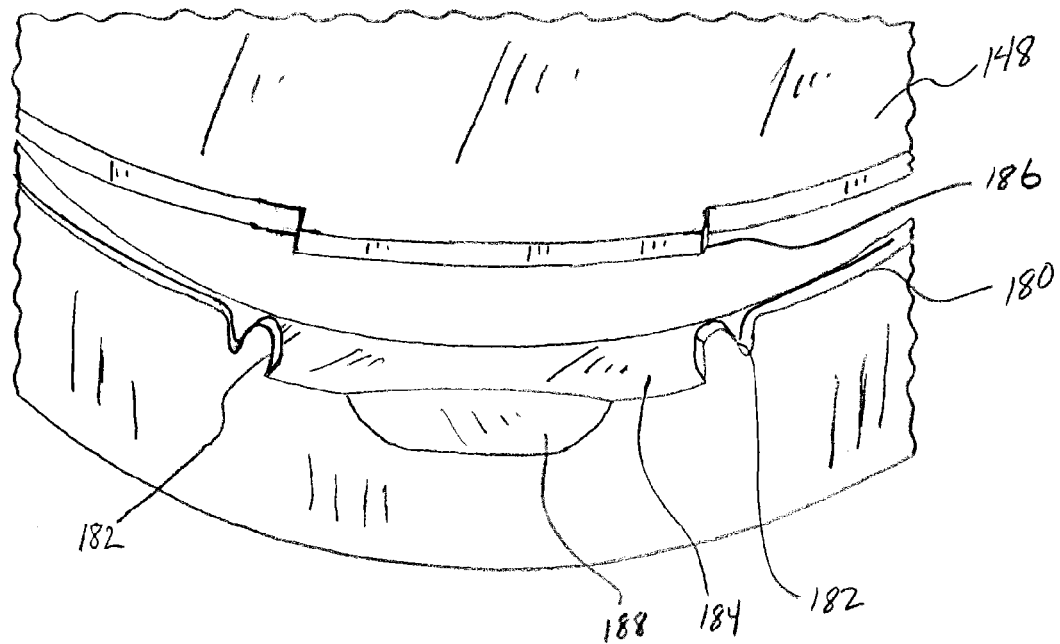
FIG. 9 is a partial view of a cover for a food dispensing container according to an embodiment of the present invention.
Figure 10:
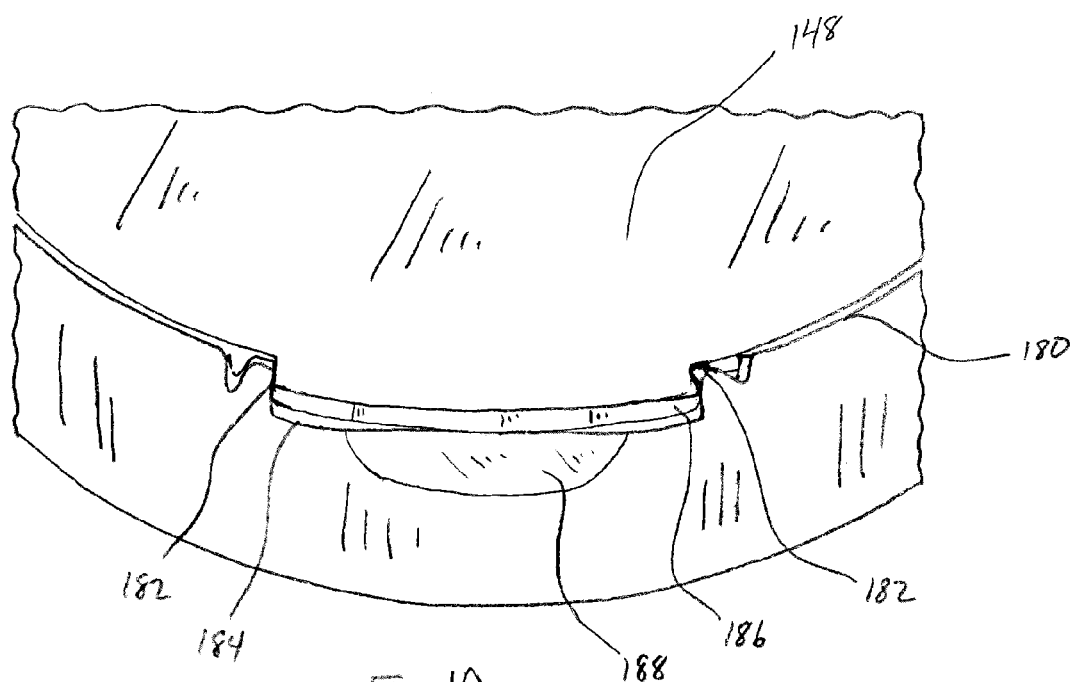
FIG. 10 is a partial view of a cover for a food dispensing container according to an embodiment of the present invention.
Figure 11A:
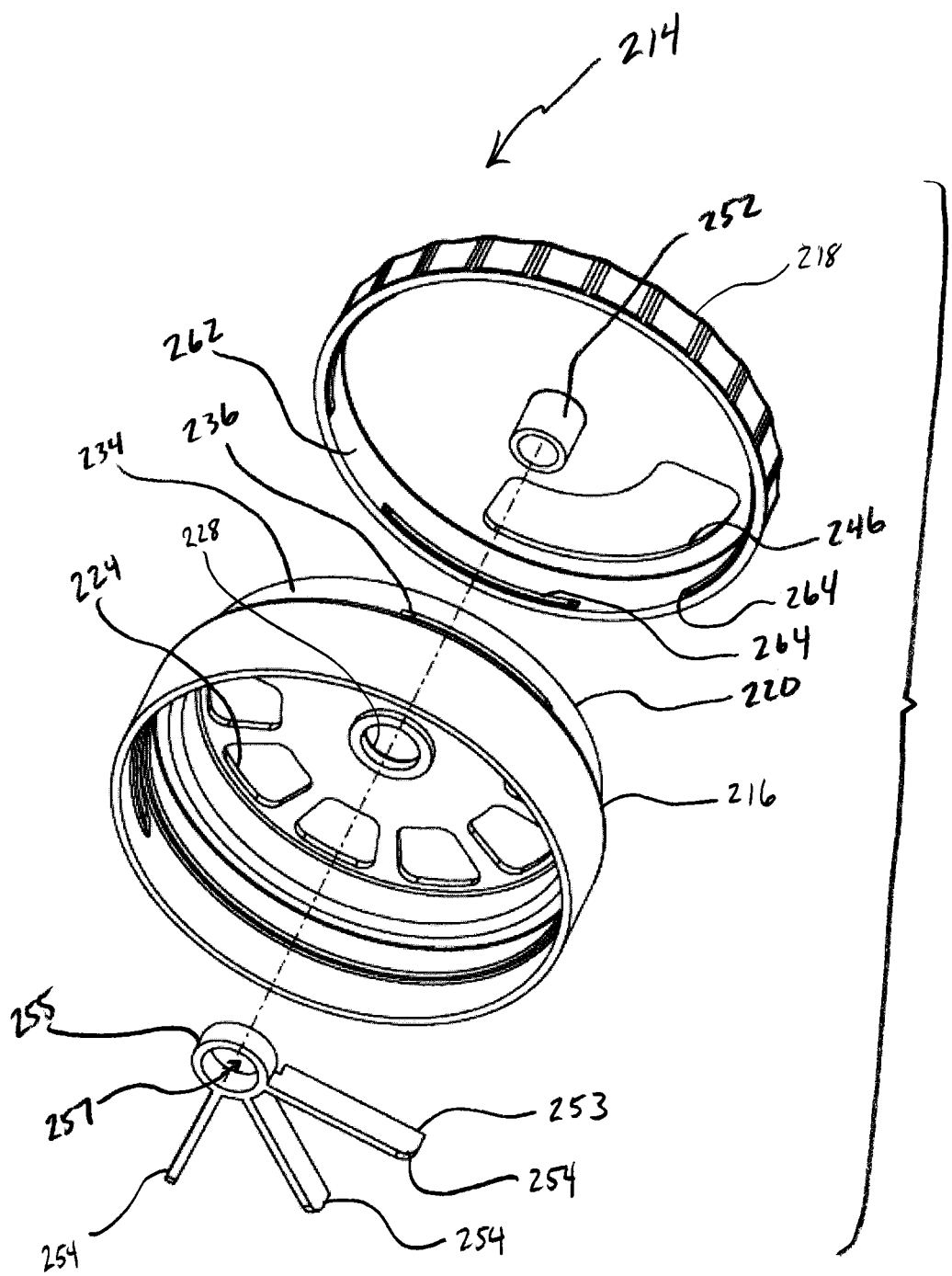
FIG. 11A is an exploded perspective view of a cover for a food dispensing container according to an embodiment of the present invention.
Figure 11D:
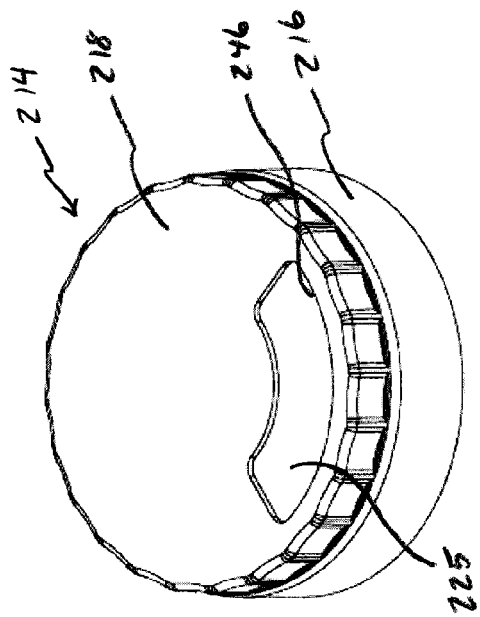
FIG. 11D is a perspective view of the cover of FIG. 11A.
Figure 11E:
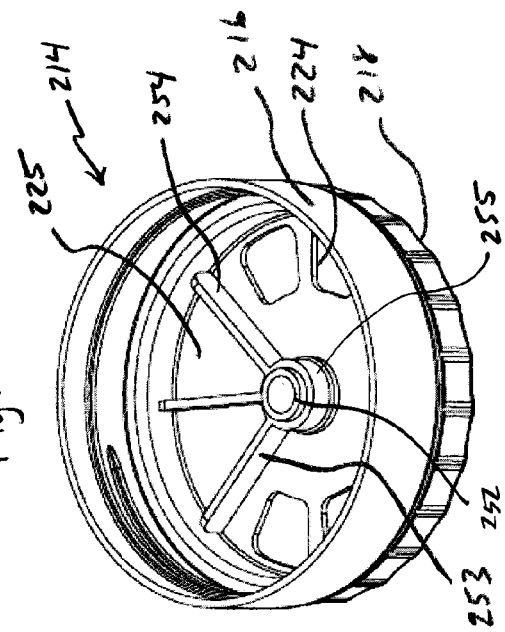
FIG. 11E is a perspective view of the cover of FIG. 11A.
Figure 11B:
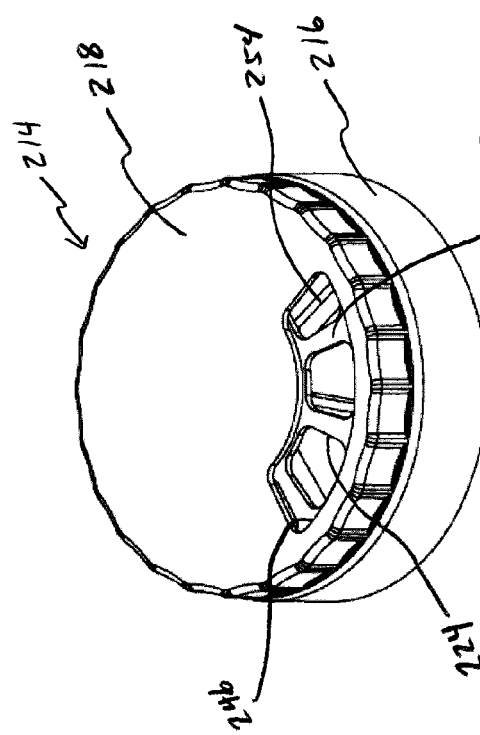
FIG. 11B is a perspective view of the cover of FIG. 11A.
Figure 11C:
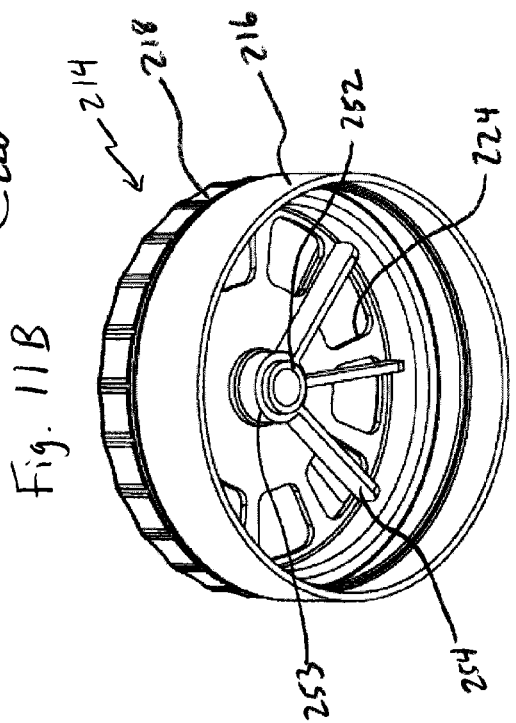
FIG. 11C is a perspective view of the cover of FIG. 11A.

An alternative configuration of a clasping mechanism to retain lid 148 in the closed position is depicted in FIGS. 9 and 10. An upwardly extending peripheral upper rim 180 of body 144 includes a pair of projections 182 with a recessed slot 184 in between. As the lid 148 is closed, tab 186 causes the projections 182 to deflect outwardly to allow tab 186 into slot 184. Once tab 186 is fully within slot 184, the projections 182 snap back inwardly into place against and in some embodiments partially over the tab 186, holding it in place. Upward pressure applied to tab 186 can then cause the projections 182 to deflect again to release tab 186. An indent 188 can be include in outer surface 156 to allow tab 186 to be grasped more easily when lid 148 is in the closed position. Indent 188 is especially useful in embodiments where tab 186 is flush with outer surface 156.

Figure 7:
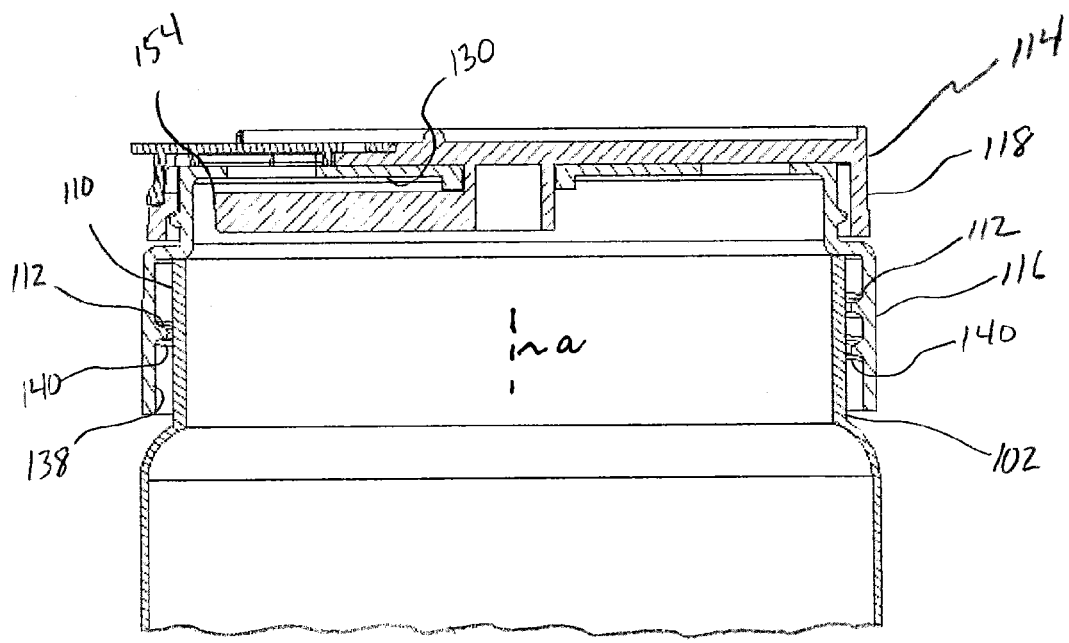
FIG. 7 is a partial cross-sectional view of a food dispensing container according to an embodiment of the present invention.
Figure 8:
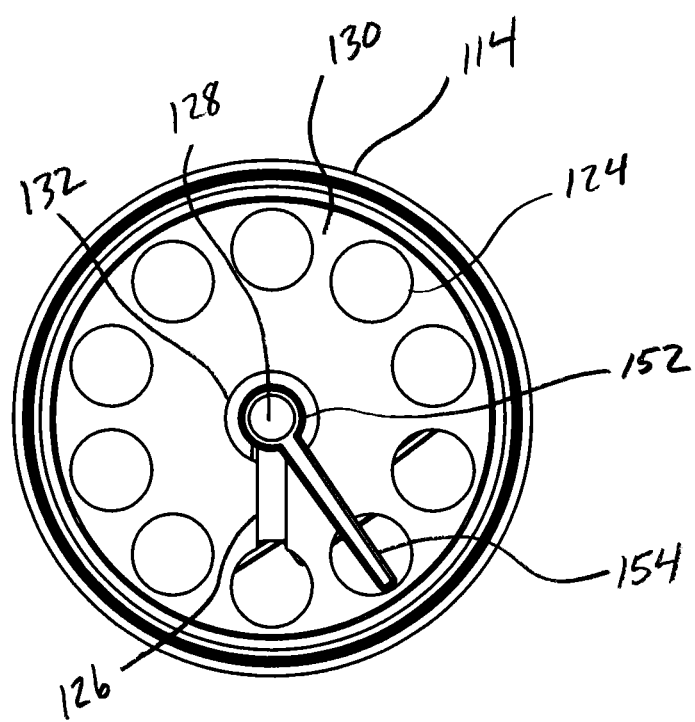
FIG. 8 is a bottom view of a cover for a food dispensing container according to an embodiment of the present invention.

Top portion 118 is coupled on top of cover base portion 116 and is rotatable relative thereto. Top portion 118 can be coupled to cover base portion 116 by aligning agitator portion 154 with slot 126 and inserting shaft portion 152 through opening 128 and agitator portion 154 through slot 126. Agitator portion 154 therefore extends through top portion 120 of cover base portion 116. In one embodiment, as can be seen in FIG. 7, agitator portion 154 is disposed proximate inner surface 130 of cover base portion 116. In other embodiments, agitator portion can be displaced further into open interior 104 of container portion 102.

In the embodiment shown in FIGS. 2-8, when agitator portion 154 is in a position where it is not aligned with slot 126, rotatable top portion 118 cannot be decoupled from cover base portion 116 because agitator portion 154 will interfere with inner side 130 of top portion 120 of cover base portion 116, thereby locking rotatable top portion 118 and cover base portion 116 together. However, if agitator portion 154 is aligned with slot 126 there would be a chance that rotatable top portion 118 could become decoupled from cover base portion 116 during use. This chance is decreased by the flange 132 extending downwardly from inner side 130 of top portion 120, which encircles a portion of shaft portion 152 connected to agitator portion 154, thereby increasing the frictional resistance between shaft portion 152 and opening 128 and further reducing the likelihood of unintentional decoupling of rotatable top portion 118 and cover base portion 116.

To prevent the rotatable top portion 118 and cover base portion 116 from decoupling when it otherwise might as described above, cover 114 is provided with an additional means for interlocking rotatable top portion 118 and cover base portion 116. Cooperating locking features configured as interlocking lips 164 on inner surface 162 of rotatable top portion 118 and ribs 136 on outer surface 134 of cover base portion 116 also serve to interlock rotatable top portion 118 and cover base portion 116. As agitator portion 154 is inserted though slot 126, lips 164 are forced over ribs 136 to provide an interlocking snap fit. Thus, even when agitator portion 154 is aligned with slot 126, the rotatable top portion 118 and cover base portion 116 will not become accidentally separated from each other during normal use due to the interlocking lips 164 and ribs 136. Rotatable top portion 118 and cover base portion 116 can be easily manually decoupled, when desired, by aligning agitator portion 154 with slot 126 and by applying enough force to overcome the snap-fit between lips 164 and ribs 136 and the frictional resistance provided by shaft portion 152 and flange 132.

As can be seen in FIG. 7, cover 114 can be rotatably threaded onto container portion 102 with threads 140 on inner surface 138 of cover base portion 116 interlocking with threads 112 and outer surface 110 of container portion 102. Cover 114 can accordingly be removed from container portion 102, exposing open top 106 and open interior 104, by rotating cover 114 in the opposite direction. Alternatively, cover 114 can attach to container portion 102 by any other known means, such as a snap-fit or an interference fit.

In operation, food particles can be freely dispensed from container 100 without interruptions caused by clumping of the particles or interference by the user's hand. Initially, lid 148 is opened to expose opening 146 and optionally secured in the open position by inserting rib 176 through slot 174. This exposes the dispensing apertures 124 in cover base portion 116, so that, when inverted, food particles can flow from the container. As food particles are being dispensed, the user can rotate the top portion 118 relative to container portion 102 and cover base portion 116 by gripping the outer surface 156 of top portion 118 with one hand and the container portion 102 with the other hand. Depending on the needs and preference of the user, this can be accomplished by holding the top portion 118 in place while rotating the container portion 102 and cover base portion 116, rotating the top portion 118 while holding container portion 102 and cover base portion 116 in place, or rotating both the top portion 118 and container portion 102 and cover base portion 116 in opposite directions. This relative movement causes agitator portion 154 to sweep along the inner side 130 of top portion 120 of cover base portion 116 adjacent dispensing apertures 124. Thus, any clumps of food particles adjacent dispensing apertures 124 that are too big to fit through dispensing apertures 124 will be broken up into smaller particles by agitator portion 154 and dispensed. Food particles can therefore be broken up as they are dispensed, which avoids interruptions typically caused by having to break up the clumped food particles. In addition, because the user rotates the top portion 118 and container portion 102 relative to each other by gripping the outer surface 156 of the top portion 118 and the container portion 102, the user's hand does not interfere with dispensing the product.

Cover 114 is preferably manufactured from a plastic material through an injection molding process. However, any other method of manufacturing plastic parts could also be used to make cover 114. In one embodiment, top portion 118 and cover base portion 116 are simultaneously molded side-by-side in the same mold, and then coupled together by automated means before being ejected from the mold. In other embodiments, rotatable top portion 118 and cover base portion 116 can be coupled after being ejected from the mold or can be molded in separate processes. Preferably, shaft portion 152 and agitator portion 154 are molded unitarily with the rest of rotatable top portion 118 so that cover 114 comprises a two-piece assembly.

FIGS. 11A-11E depict another embodiment of a cover 214 that can be used with a container 100 as described herein. Cover 214 can be a three-piece assembly including a cylindrical cover base portion 216, a rotatable top portion 218 and a separate agitator portion 253. Agitator portion 253 can include a hollow cylindrical shaft portion 255 having a bore 257 therethrough and one or more radially extending agitator portions 254. Although depicted as having three agitator portions 254, cover 214 can include a larger or smaller number of agitator portions 254. When multiple agitator portions 254 are present, they can be spaced around shaft portion 255 in any fashion. For example, they can be grouped closely together as shown in FIGS. 11A-11E, spread evenly around shaft portion (see FIGS. 12A-12C), or spaced apart in any other patterned or random fashion.

In the embodiment depicted in FIGS. 11A-11E, cover 214 includes dispensing apertures 224 through top portion 220 of cover base portion 216 around only part of the circumference of cover base portion 216. The continuous portion 225 that does not have dispensing apertures 224 therefore functions as a lid when aligned with the opening 246 of top surface to preclude contents from being dispensed from the container. In some embodiments, there can be projections, recesses, detents or other structural features in cover base portion 216 and/or rotatable top portion 218 to allow the opening 246 to properly align and be held in alignment with continuous portion 225 when it is desired to prevent contents from being dispensed from the container.

To assemble cover 214, shaft portion 252 of rotatable top portion 218 can be inserted through central opening 228 of cover base portion 216 and lips 264 on inner surface 262 of rotatable top portion 218 can be interlocked with ribs 236 on outer surface 234 of cover base portion 216 as described previously. Bore 257 of shaft portion 255 of agitator portion 253 can then be inserted onto shaft portion 252 of rotatable top portion 218. Agitator portion 253 can remain on shaft portion 252 via an interference fit or snap fit utilizing cooperating ribs or lips. Alternatively or additionally, agitator portion 253 can be glued, welded, or otherwise adhered to shaft portion 252.

Figure 12B:
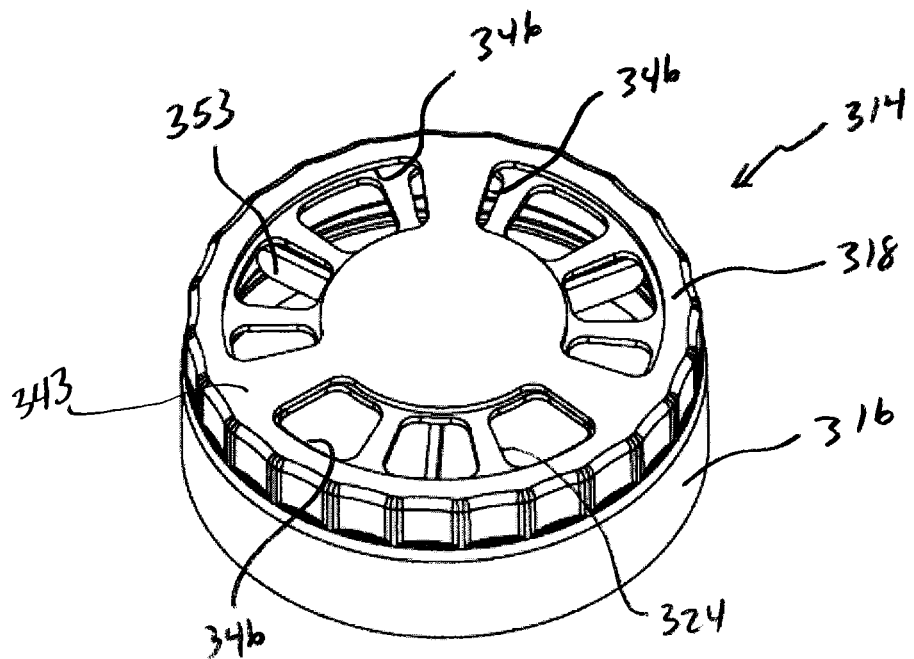
FIG. 12B is a perspective view of the cover of FIG. 11A.
Figure 12C:
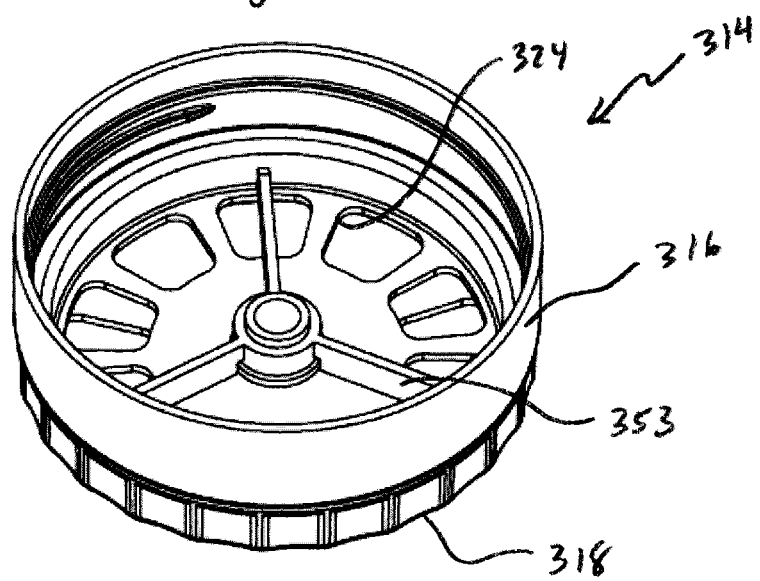
FIG. 12C is a perspective view of the cover of FIG. 11A.
Figures 12A, 13:
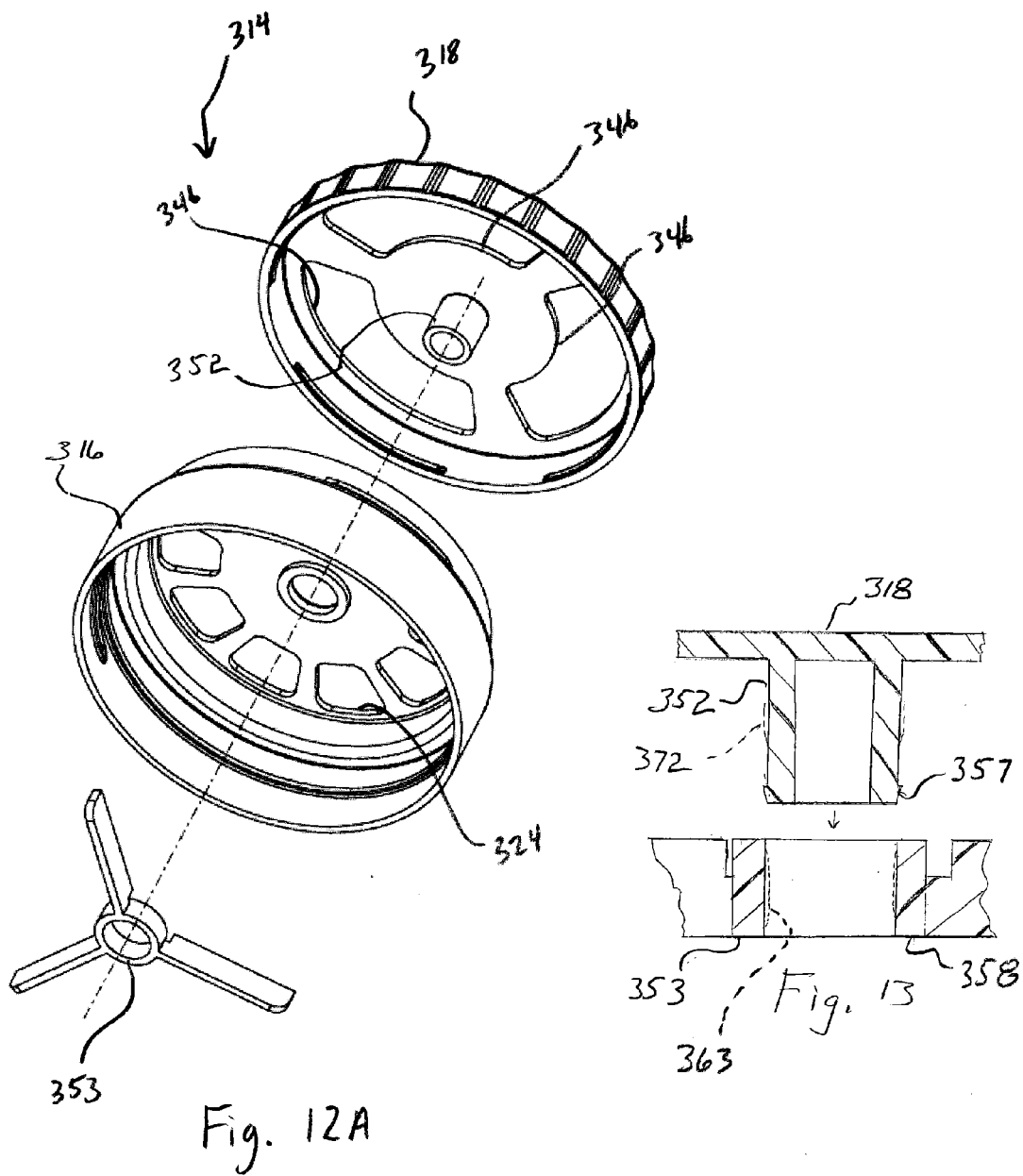
FIG. 12A is an exploded perspective view of a cover for a food dispensing container according to an embodiment of the present invention.
FIG. 13 is across sectional view through connection structure for assembling the agitator structure to the shaft portion according to an embodiment of the invention.

FIGS. 12A-13 depict a further embodiment of a cover 314 that can be used with a container 100 as described herein. Cover 314 also comprises a three-piece assembly including a cover base portion 316, a rotatable top portion 318 and clump decimator, or an agitator portion 353. In this embodiment, cover 314 includes dispensing apertures 324 disposed all the way around cover base portion 316 and a plurality of openings 346 in rotatable top portion 314. This provides greater dispensing capacity for higher volume applications. Although the rotatable top portion 314 is depicted as having three openings 346 arranged around its circumference, the number, size and arrangement of openings can, of course, be varied. In an embodiment such as that depicted in FIGS. 12A-12C, a separate lid (not pictured) can be provided to selectively cover the entire top surface 343 of rotatable top portion 318 to preclude material from being dispensed through apertures 324.

FIG. 13 illustrates a circumferential locking structure configured as a wedge portion 357 on the shaft portion 352 that allows the ring portion 358 of the agitator portion with an aperture 359 with a diameter slightly less that the diameter through the wedge portions to facilitate the agitator ring portion snapping onto the shaft portion with the cover base portion captured therebetween. Such features may be utilized in the other embodiments illustrated herein. For example, a circumferential locking structure may be utilized on the shaft portion 152 with the embodiment of FIG. 5 instead of or in addition to the circumferential cooperating locking features 136 and 164. Also such structure is suitable for the embodiment of FIG. 11a.

Additional ribbing or axially extending locking structure 363 on the inside surface 366 of the bore 368 can cooperate with locking structure 372 on the outside surface of the shaft portion 252 to thereby nonrotationally lock the agitator portion with respect to the shaft portion. Such structure is suitable for the embodiment of FIG. 11a.

In other embodiments the agitator portion may be welded to the shaft portion after assembly to secure same thereon.

The container portion and top covers may be formed by conventional molding techniques. Generally, it is contemplated that the bottle may be formed by a blow molding operation and the cover may be formed by way of injection molding. Injection molds may be utilized in association with robots to assembly the top cover components subsequent to the molding process, for example, after they are ejected from the molds, eliminating additional assembly steps.

It should be noted that although various embodiments of a cover 114, 214, 314 have been described, any features from any of the embodiments can be combined with any of the other embodiments as desired.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered by the spirit and technical theory of the subject invention.

The invention claimed is:

1. A container for dispensing a food product, comprising:
a container portion having an open interior and an open top; and
a cover attached to the container portion and covering the open top for selectively providing an opening into the container portion, wherein the cover comprises:
a cover base portion coupled to the container portion at the open top of the container portion, the cover base portion having a horizontal wall portion traversing the open top of the cover and a wall with a generally cylindrical exterior surface extending downwardly from the wall portion, the horizontal wall portion including a centrally positioned aperture with a radially extending slot, and a plurality of food dispensing apertures arranged peripherally on the horizontal wall portion for allowing a food product to be dispensed therethrough; and
a rotatable top portion positioned on top of the cover base portion and rotatably connected thereto, the rotatable top portion extending over the entirety of the horizontal wall portion of the cover base portion and providing a closure thereto, the rotatable top portion including a unitary downwardly extending shaft portion and an agitator portion unitary with and extending radially outward from the shaft portion below and along the horizontal wall portion, the cylindrical shaft portion and unitary agitator portion passable through the centrally positioned aperture with the slot of the cover base portion for assembly of the rotatable top portion to the cover base portion, the agitator portion positioned below the wall portion of the cover base portion and fixed with respect to the rotatable top portion to rotate with respect to the container portion as the rotatable top portion is rotated, the rotatable top portion further comprising only a single access opening on the rotatable top portion, the single access opening alignable with the plurality of food dispensing apertures arranged peripherally on the horizontal wall portion thereby allowing food product in the container to be dispensed through both the cover base portion and the rotatable top portion, the single access opening in fixed alignment with the agitator portion thereby allowing the agitator to break up clumps that are in a position to be dispensed when the rotatable portion is rotated, the cover closeable to preclude product from being dispensed at the opening in the rotatable top portion without an additional component.

2. The container of claim 1, wherein the rotatable top portion includes an outer peripheral gripping surface with a plurality of indentations that is positioned entirely above the wall with the generally cylindrical exterior surface of the cover base portion, extends entirely around a periphery of the rotatable top portion and is configured to be rotated via the outer peripheral gripping surface.

3. The container of claim 1, wherein the agitator portion is aligned with a flap removably covering the single opening in the rotatable top portion.

4. The container of claim 1, wherein the cover base portion includes at least one rib extending along an outer peripheral surface of the cover base portion and the rotatable top portion includes at least one lip extending along an inner peripheral surface of the rotatable top portion, and wherein the at least one rib and at least one lip are configured to engage one another to impede decoupling of the rotatable top portion from the bottom portion.

5. The container of claim 1, wherein the cover base portion and rotatable top portion have cooperating structure to effect a snap engagement when assembled.

6. The container of claim 1, wherein the rotatable top portion has an opening with a flap and wherein the agitator portion is axially aligned with the flap and opening.

7. The container of claim 1, wherein the rotatable top portion includes an aperture selectively coverable with a lid.

8. The container of claim 7, wherein the rotatable top portion includes a means for retaining the lid in a closed position covering the aperture.

9. The container of claim 7, wherein the rotatable top portion includes a means for retaining the lid in an open position.

10. The container of claim 1, wherein the shaft portion defines a hub extending downwardly from the rotatable top portion, wherein the agitation portion extends radially from the hub.

11. The container of claim 1, wherein the rotatable top portion includes a plurality of radially extending agitator portions each of which is in alignment with the single access opening of the rotatable top portion.

12. The container of claim 11, wherein the plurality of radially extending agitator portions are commonly connected to the shaft portion extending downwardly from an inner surface of rotatable top portion and are unitary therewith.

13. A container for dispensing a food product, comprising:
a container portion having an open interior and an open top; and
a generally circular cover for attachment to the container portion and for covering the open top and for selectively providing an opening therein for dispensing the food product, wherein the cover comprises:
a cover base portion attached to the container portion at the open top, the cover base portion having a wall portion traversing the open top and including a central aperture and a plurality of apertures positioned around the central aperture for allowing a food product to be dispensed through the plurality of apertures, the cover base portion having a periphery and a skirt shaped body extending downwardly at the periphery;
a rotatable top portion coupled on top of the cover base portion and covering all of the plurality of apertures, the rotatable top portion rotatable relative to the cover base portion and the container portion, the rotatable top portion having a periphery and a skirt extending downwardly at the periphery, and a hub portion positioned in the central aperture and a clump decimator portion extending axially away from the hub portion below the wall portion of the cover base portion, the rotatably top portion having an opening with an openable and closable top flap for selectively dispensing food product that passes through the plurality of apertures, whereby the top portion provides a closure to the cover base portion precluding dispensing of food product when the flap is closed, wherein the cover base portion and the rotatable top portion are coupled with two distinct, axially separated cooperating engagement portions, a first engagement portion disposed at the periphery of the cover base portion and a second engagement portion disposed at the periphery of the rotatable top portion, wherein the clump decimator portion is fixed in positioned in alignment with the opening thereby breaking up clumps of food product in a position to be dispensed.

14. A cover for covering an open top and to selectively provide an opening in a container for dispensing food, comprising:
- a cover base portion configured to be coupled to the open top of the container portion, the cover base portion including a traversing wall portion having plurality of apertures for allowing a food product to be dispensed therethrough; and
- a rotatable top portion with a periphery configured to be coupled on top of the cover base portion providing a closure for the plurality of apertures whereby the dispensing of the food product is precluded, the top portion rotatable relative to the cover base portion and the container portion, the rotatable top portion including a shaft extending through the cover base portion, a radially extending agitator portion extending radially from the shaft portion and directly below the traversing wall portion and in alignment with an opening in the rotatable top portion to rotate with respect to the cover base portion and container portion and to break up clumps of food product in a position to be dispensed as the rotatable top portion is rotated.

15. The container of claim 14, wherein the rotatable top portion includes an outer peripheral gripping surface and is configured to be rotated via the outer peripheral gripping surface.

16. The container of claim 14, wherein the agitator portion extends through the cover base portion through a radially extending slot in the base portion.

17. The container of claim 14, wherein the rotatable top portion has a top wall portion providing the closure of the plurality of apertures and the top wall portion has a flap openable and closeable for selectively dispensing food and wherein the radially extending agitator portion is axially aligned with the flap.

* * * * *